Dec. 26, 1950  O. LOOFT  2,535,500
PLATE AND DISH WARMING DINING TABLE
Filed Dec. 1, 1949  2 Sheets-Sheet 1
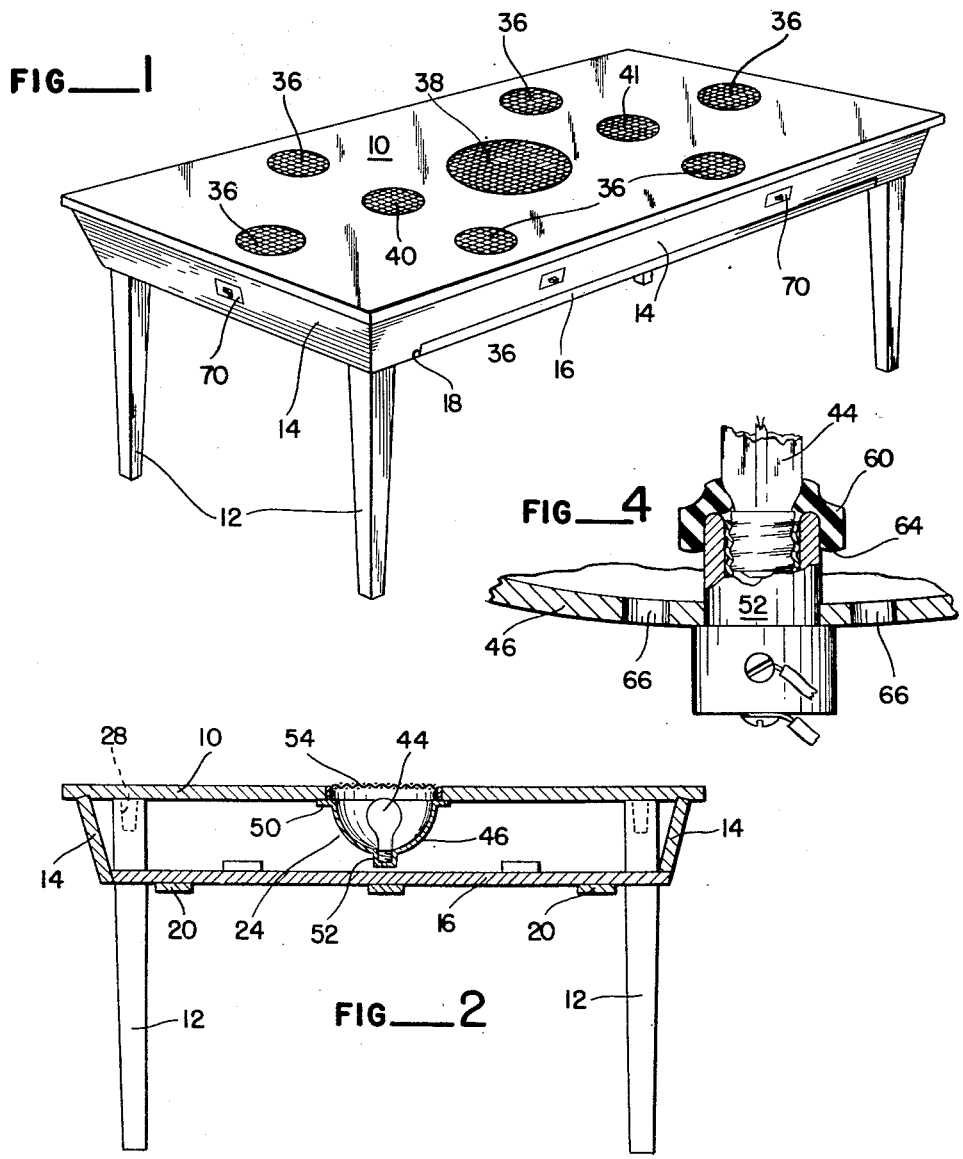
OTTO LOOFT
Inventor
By Smith + Tuck
Attorneys

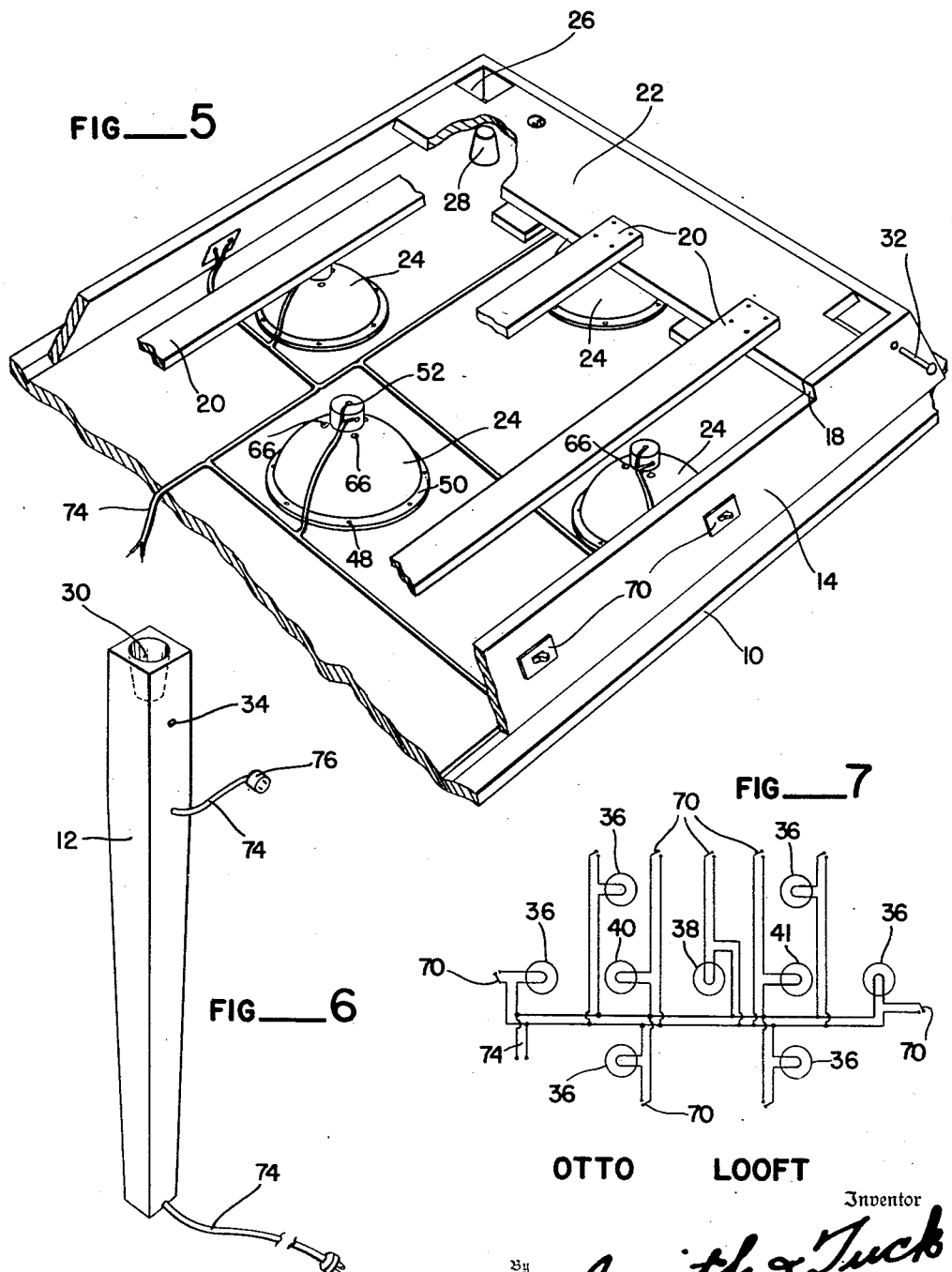

Patented Dec. 26, 1950

2,535,500

UNITED STATES PATENT OFFICE 2,535,500

PLATE AND DISH WARMING DINING TABLE

Otto Looft, Seattle, Wash.

Application December 1, 1949, Serial No. 130,485

3 Claims. (Cl. 219—45)

The present invention, which is intended for family or restaurant use, provides the usual dining table top surface and has the added provision that, at the normal place setting, means are provided for projecting upwardly a limited supply of heat, so that plates and serving dishes can be kept warm throughout the duration of a meal.

It is a well recognized fact that, no matter how careful the housewife or restaurant management may be, the best they can do is to serve food to diners that is hot when served, and possibly the same may be served on heated plates. Now, it has been found that, if a meal is to be enjoyed as a period of relaxation, a condition that has long been urged by medical science, the result is that while the meal may have been served warm or hot, long before the meal is finished the plates and the food on the plates are cold. For many forms of food this is possibly not too material, however where gravies or any grease or butter-enriched foods are used, it is very objectionable, and this condition cannot be overcome with present equipment in the dining room of the average home, or in the dining rooms of even the better restaurants.

There is another field, however, where this equipment is particularly desirable, especially as it is well recognized that great emphasis is being placed upon outdoor eating. The various building magazines and new constructions are showing, in increasing numbers, the outdoor patio for use in dining. Many restaurants have come to realize that people want to eat outdoors after the European style, and for that reason a large number of restaurants and hotels, particularly of the resort type, have spent increasing efforts in an endeavor to provide satisfactory outdoor eating facilities for their patrons. It has been found that no matter how interesting the vista may be from the outdoor eating table, if the food becomes cold quickly, a great deal of the patron's interest in the otherwise carefully worked out facilities is lost. It is to overcome this widespread unsatisfactory condition that this present invention is provided. Following the teachings of this present invention means are provided, not for keeping food hot actually, but for keeping the dishes, upon which the food is placed, warm to a degree where there will be no congealing of grease enriched foods, and other foods having a liquid as a component part will not become cold and unappetizing. It is, therefore, believed that this present invention will go a long way toward solving this perplexing problem and assist greatly in the enjoyment of eating in general, and most especially in all forms of outdoor eating.

The principal object of this present invention is to provide a convenient, safe, and economically arranged means for maintaining the serving plates and serving dishes used in the ordinary meal at a temperature sufficiently high to overcome the objections to the cooling of food.

A further object of this present invention is to provide a table in which the various place settings are capable of being kept warm and wherein the serving dishes themselves can be kept warm to a satisfactory degree.

A further object of this invention is to provide a dining table having heating means for the essential dishes normally used thereon, and to have this arranged in a manner devoid of any element of danger to the users and in such manner that over-heating could never occur.

A further object of this invention is to provide a dining table that to all outward appearances is conventional, yet which will be capable of keeping the food served thereon in a warm and palatable condition.

Further objects, advantages and capabilities will be apparent from the description and disclosure in the drawings, or may be comprehended or are inherent in the device.

In the drawings:

Figure 1 is a perspective view showing one physical embodiment of this invention;

Figure 2 is a typical cross-sectional view through the table of Figure 1;

Figure 3 is a perspective view of one of the cover elements used with the heating devices;

Figure 4 is a sectional view through a typical heating unit showing means for protecting the electrical unit from spillage.

Figure 5 is a fragmentary bottom perspective view of a portion of the table of Figure 1, with certain parts being shown in section;

Figure 6 is a perspective view showing one leg of the table of Figure 1, illustrating the manner in which electric current is supplied to the same;

Figure 7 is a diagrammatic, electrical diagram showing the manner in which the table of Figure 1 is wired for convenient use.

Referring more particularly to the disclosure in the drawings, the numeral 10 designates generally the top table surface. This table surface can be made of any suitable materials now generally used in the manufacture of tables, the most common being wood; however, recent developments have prompted the more extended use of laminated or veneered wood, and many forms of bonded fibrous base boards are also being employed. Following the general principles of table manufacture, a plurality of legs 12 are employed to support the table top 10, and a skirting 14 is employed to give that expected finish to the table, which has long been employed in order to give added stiffness to the legs at the point of their attachment to the table. Such construction is that quite normally found in best table design. As an added feature to the normal conventional structure is the sliding bottom member 16; this normally is arranged to set in flush in notched-out portions, as at 18, of one of the side skirting members. The bottom 16 is supported in this position by a plurality of slats as 20. To complete the enclosure, it has been found desirable to use end bottom closure members as 22, normally one at each end of the table. These two members, together with the body member 16, serve to fully house the under portion of the table top, and provide a suitable space for the insertion of the various heating elements referred to generally by the reference character 24. With this arrangement the heating elements are fully protected so that no one, not even a child reaching under the table, would ever come in contact with any of the heating elements or the electric supply wires used therewith. On the other hand, when servicing or when repairs become necessary, the units are fully exposed by merely withdrawing the sliding member 16.

It has been found desirable, as an aid in shipping this unit as an article of manufacture, to provide a novel means of securing these various legs 12 to the tables. The details of this arrangement are probably best shown in Figures 4 and 5, in which the portions are cut out, as at 26, to fit the outer contour of the table leg, and coaxially with the cut-out portion 26 are conical engaging members 28. These members are adapted to come to a firm seat within the conical recesses 30 provided in each of the legs 12. A through bolt, as 32, is provided to secure the leg in its assembled position. This bolt, passing through opening 34 in leg 12, also passes through a corresponding opening in cone 28 and secures the leg in fixed relationship to the table assembly. At the same time the leg can be easily removed for shipping or storage purposes. This latter function is particularly desirable in a unit of this order in that it may experience only seasonal use in certain parts of our country.

The arrangements of the heating units can be, of course, subject to wide modifications in accordance with the particular need or desire of the users. In Figure 1 has been shown the place setting heaters at 36, it normally being intended that there will be one such unit at each place setting, which will be employed to keep the service plate warm at all times. It is conceivable that for certain uses a second unit, possibly wired to the same switching means, could be employed for the purpose of keeping a coffee or teacup warm.

Disposed at another point in the central portion of table top 10 are the heating units employed for the heating of serving dishes. Illustrative of this arrangement is a large central heating member at 38 and smaller heating members as at 40 and 41. Thus, for instance, the roast being served with the meal might be positioned on heating member 38 and a vegetable, for instance, on member 40, and the gravy made from the roast on unit 41.

It has been found highly satisfactory to provide a heating unit which is incapable of developing heat above a certain desirable level. In other words, the heating temperature of a service plate, for instance, must be below the level which will be uncomfortable to touch, and the temperature should be maintainable without attention or any fear that it will build up if, for instance, the diners leave the table and neglect to turn off the current energizing the heating unit. It has been found that, considering the need of serving the intended purpose, and providing against any danger of excessive temperatures incidental to such operations, the employment of the ordinary illuminating electric lamp is the most desirable source of heat, and these have been illustrated in the drawings accompanying this application. It will, of course, be apparent that if the unit were to be used, as in a commercial establishment where strict attention could be paid to the heating elements, then it might be possible to employ some of the black wire heating devices, or even the infra-red type of lamps. Such, though, is not desired for general use, as this table arrangement is in no sense intended to usurp the function of the ordinary steam table, but is intended strictly as a dining table, and as such, provisions should be made, as outlined in this application, to provide a unit that can be safely and conveniently used for all dining purposes, and most particularly for the use of the average family in and about their residence.

It has been found that, in the employment of the illuminating lamp, as 44, it should preferably be set into a supporting and protecting reflector unit, as 46, which can be used as the supporting element and be secured by screws, as 48, passing through rim 50 and securing the same to the table top 10. A socket normally will be formed as part of this reflector element and is indicated only generally at 52. Disposed above lamp 44, and providing for a continuation of the normal table top 10, is preferably a substantially constructed metal screen 54. This screen should be of the general character often referred to as hardware cloth, or something of that order that will have considerable strength within itself. In some instances, a perforated metal screen may be used. The screen 54, for purposes of convenience in maintenance and for strength in serving its purpose, is best formed as a unit with an enclosing rim or bezel 56. Rim 56, normally should be the same width as the thickness of table top 10, so that it will function substantially after the showing of Figure 2. In this way the screen 54 will provide a smooth continuation of the table top 10 and, normally, should not in any way show through the tablecloth when the table is set. The lamp itself, of course, being a source of light as well as heat, will project its beam through the tablecloth. For this reason the table is normally set and, after the dishes are in place, the individual lamps 54 are turned on. To facilitate this, a plurality of switches are provided.

As the spilling of liquids may occur on any dining table, means are provided to prevent any interference with the electrical elements in case such accidents should occur. Referring to Figure 4, it will be noted that a resilient shield 60 is disposed to encircle the stem of the light globe 44, and a downwardly extending annular lip 64 covers the top of the socket 52. Drain openings 66 are provided in reflector 46 so that any liquid spilled into the reflector will drain out immediately.

A satisfactory lighting circuit is shown in Figure 7 in which power is supplied through the input leads 74, and then the various heating elements, or lamps, are connected to this source of power in parallel, each with its own controlling switch 70. A desirable means for introducing the power circuit is through the arrangement shown in Figure 6, in which the energizing cable 74 is brought up through the table leg to the female plug 76 which, in turn, energizes the heating elements.

It is believed that it will be clearly apparent from the above description and the disclosure in the drawings that the invention comprehends a novel construction of a plate and dish warming dining table.

Having thus disclosed the invention, I claim:

1. The combination of a dining table having a table top and an improvement for the heating of individual place settings and serving dishes associated therewith, comprising: a plurality of heating units disposed below the surface of said table top; each heating unit having a dome-shaped reflector directed upwards provided with a peripheral rim secured to the lower side of said table top; each heating unit having an electric socket positioned in the center of the lower portion of said reflector, and an electric globe positioned in an upright manner in said socket; each heating unit having a pervious screen to enclose the upper portion of said reflector; there being a rim on said screen adapted to seat on said reflector and to position the pervious screen in the plane of the upper surface of said table top; an electric supply circuit connected to said sockets and having a plurality of contact switches disposed so as to provide for the selective employment of said heating units; a resilient shield disposed to encircle the stem of said electric globe and prevent liquid from entering the top of said electric socket; and said reflectors having drain openings in the bases thereof.

2. The combination of a dining table having a table top and an improvement for the heating of individual place settings and serving dishes associated therewith, comprising: a plurality of heating units; each heating unit having a dome-shaped reflector directed upwards provided with means for mounting said reflector on the lower side of said table top, and each reflector having drain openings in the base thereof; each heating unit having an electric socket positioned in the center of the lower portion of said reflector, an upright electric globe positioned in said socket, and a resilient shield disposed to encircle the stem of said electric globe with a downwardly extending annular lip covering the top of said socket; each heating unit having a pervious screen to enclose the upper portion of said reflector positioned in the plane of the upper surface of said table top; and an electric supply circuit connected to said sockets.

3. The combination of a dining table of the type having a table top and a plurality of legs supporting said top and an improvement for maintaining the warmth of food in dishes, comprising: a plurality of heating units disposed below the surface of said table top; each heating unit having a dome-shaped reflector directed upwards with a peripheral rim secured to the lower surface of said table top; each heating unit having an electric socket centered in the base of said reflector and an electric globe positioned in said socket; each heating unit having a pervious screen to enclose the upper portion of said reflector and positioned in the plane of the upper surface of said table top; a sliding bottom member positioned horizontally below said heating elements to afford access to said heating elements; a longitudinal passageway in one of said table legs; an electric supply circuit connected to said sockets, the leads for connection to the source of electricity running through said passageway; there being a rim on said screen adapted to seat on said reflector; each reflector having drain openings in the base thereof; a resilient shield disposed to encircle the stem of said electric globe with a downwardly extending annular lip covering the top of said socket; and a plurality of contact switches in said electric supply circuit disposed so as to provide for the selective employment of said heating units.

OTTO LOOFT.

REFERENCES CITED

The following references are of record in the file of this patent:

UNITED STATES PATENTS

| Number | Name | Date |
| --- | --- | --- |
| 791,708 | Matcovitch | June 6, 1905 |
| 881,017 | Morse | Mar. 3, 1908 |
| 1,084,877 | Cary | Jan. 20, 1914 |
| 2,424,268 | Delano | July 22, 1947 |